United States Patent
Shin et al.

(10) Patent No.: US 10,873,275 B2
(45) Date of Patent: Dec. 22, 2020

(54) TRIBOELECTRIC GENERATOR

(71) Applicants: Samsung Electronics Co., Ltd., Suwon-si (KR); Research & Business Foundation Sungkyunkwan University, Suwon-si (KR)

(72) Inventors: Hyeonjin Shin, Suwon-si (KR); Sangwoo Kim, Yongin-si (KR); Seongsu Kim, Seoul (KR); Jihye Kim, Suwon-si (KR)

(73) Assignees: Samsung Electronics Co., Ltd., Gyeonggi-do (KR); Research & Business Foundation Sungkyunkwan University, Gyeonggi-do (KR)

( * ) Notice: Subject to any disclaimer, the term of this patent is extended or adjusted under 35 U.S.C. 154(b) by 162 days.

(21) Appl. No.: 15/810,679

(22) Filed: Nov. 13, 2017

(65) Prior Publication Data
US 2018/0145613 A1    May 24, 2018

(30) Foreign Application Priority Data
Nov. 23, 2016  (KR) .......................... 10-2016-0156711

(51) Int. Cl.
    *H02N 1/04*   (2006.01)
(52) U.S. Cl.
    CPC ..................... *H02N 1/04* (2013.01)
(58) Field of Classification Search
    CPC ......................... H02N 1/04; H02N 1/00–1/12
    USPC .................................................. 310/300, 309
    IPC .................................................... H02K 001/04
    See application file for complete search history.

(56) References Cited

U.S. PATENT DOCUMENTS

| | | | | |
|---|---|---|---|---|
| 2015/0061460 A1* | 3/2015 | Bae | ........................ | H02N 1/04 310/310 |
| 2015/0333196 A1* | 11/2015 | Shin | .................... | H01L 31/0324 257/29 |
| 2016/0111978 A1* | 4/2016 | Kim | ........................ | H02N 1/04 310/310 |
| 2018/0013359 A1* | 1/2018 | Park | ........................ | H02N 1/04 |

FOREIGN PATENT DOCUMENTS

| KR | 1532887 | 7/2015 | |
|---|---|---|---|
| KR | 101544326 B1 * | 8/2015 | ............... H02N 1/04 |
| KR | 20160052171 A | 5/2016 | |
| WO | WO-2016089046 A1 * | 6/2016 | ............... H02N 1/04 |

OTHER PUBLICATIONS

Han et al., Hexagonal boron nitride assisted growth of stoichiometric Al2O3 dielectric on graphene for triboelectric nano-generators, Jan. 24, 2015, Nano Energy (2015) 12, 556-566. (Year: 2015).*

* cited by examiner

*Primary Examiner* — Thomas Truong
(74) *Attorney, Agent, or Firm* — Harness, Dickey & Pierce, P.L.C.

(57) ABSTRACT

A triboelectric generator includes a ferroelectric material layer and a protective layer provided over the ferroelectric material layer including first and second electrodes that are spaced apart from each other, a polarized ferroelectric material layer provided over the first electrode and configured to generate electrical energy by contact with another material, and a protective layer provided over the ferroelectric layer to prevent diffusion of charges generated on the ferroelectric layer.

15 Claims, 6 Drawing Sheets

FIG. 1

NEGATIVE POLING

POSITIVE POLING

TRIBOELECTRIC GENERATOR

CROSS-REFERENCE TO RELATED APPLICATION

This application claims the benefit of priority from Korean Patent Application No. 10-2016-0156711, filed on Nov. 23, 2016, in the Korean Intellectual Property Office, the disclosure of which is incorporated herein in its entirety by reference.

BACKGROUND

1. Field

Example embodiments relate to a triboelectric generator, and more particularly, to a triboelectric generator including a ferroelectric material layer and a protective layer provided over the ferroelectric material layer.

2. Description of the Related Art

An electrostatic energy-generating device that obtains energy using an electrostatic phenomenon caused by friction typically generates energy by a charge difference caused by static electricity generated when two materials that are alternatively in contact with, and separated from each other.

Unlike conventional solar cells, wind power, fuel cells, etc., the electrostatic energy-generating device is an eco-friendly energy-generating device which can convert mechanical energy generated from microvibration or human movement existing in the surroundings as electric energy. An energy conversion method using the electrostatic characteristics, which can be made compact and lightweight with high conversion efficiency, may have a large effect on new technology leading to a breakthrough of technology through fusion with nanotechnology.

A conventional electrostatic energy-generating device typically has a device output determined by a choice of materials according to a triboelectric series. Therefore, in order to improve the device output, most current studies have been carried out on a structure of the device or a surface topography control of the materials rather than a selection of the materials.

SUMMARY

Example embodiments relate to a triboelectric generator including a ferroelectric material layer and a protective layer provided over the ferroelectric material layer.

Additional example embodiments will be set forth in part in the description which follows and, in part, will be apparent from the description, or may be learned by practice of the example embodiments.

According to an example embodiment, a triboelectric generator includes first and second electrodes that are spaced apart from each other, a ferroelectric material layer polarized and provided over the first electrode and that generates electrical energy by contact with another material, and a protective layer provided over the ferroelectric layer to reduce or prevent diffusion of charges generated on the ferroelectric layer.

The second electrode may have a charging characteristic that is opposite to the charging characteristic of the ferroelectric material layer.

The ferroelectric material layer may generate electrical energy by contact between the second electrode and the protective layer.

The ferroelectric material layer may include at least one of polyvinylidene fluoride (PVDF), PVDF-trifluoroethylene (TrFE), lead zirconate titanate (PZT), platinum oxide (PTO), barium tin oxide (BTO), bismuth ferric oxide (BFO), KNbO3, NaNbO$_3$, germanium telluride (GeTe), zinc-oxide (ZnO), ZnSnO$_3$, and gallium nitride (GaN).

The protective layer may include at least one of hexagonal-boron nitride (h-BN) and transition metal dichalcogenide (TMD).

The TMD may include one of transition metals of molybdenum (Mo), tungsten (W), niobium (Nb), vanadium (V), tantalum (Ta), titanium (Ti), zirconium (Zr), hafnium (Hf), technetium (Tc), and rhenium (Re), and one of chalcogen elements of sulfur (S), selenium (Se), and tellurium (Te).

The protective layer may have a thickness of about 10 nm or less.

The ferroelectric material layer may be positively polarized or negatively polarized according to the charging characteristic of the second electrode.

According to another example embodiment, a triboelectric generator includes first and second electrodes that are spaced apart from each other, a ferroelectric material layer polarized and provided over the first electrode, and that generates electrical energy by contact with another material, a protective layer provided over the ferroelectric layer to prevent diffusion of charges generated on the ferroelectric layer, and a triboelectric charging layer under the second electrode.

The triboelectric charging layer may have a charging characteristic that is opposite to the charging characteristic of the ferroelectric material layer.

The ferroelectric material layer may generate electrical energy by contact between the triboelectric charging layer and the protective layer.

The ferroelectric material layer may include at least one of PVDF, PVDF-TrFE, PZT, PTO, BTO, BFO, KNbO$_3$, NaNbO$_3$, GeTe, ZnO, ZnSnO$_3$, and GaN.

The protective layer may include at least one of h-BN and TMD.

The TMD may include one of transition metals of Mo, W, Nb, V, Ta, Ti, Zr, Hf, Tc, and Re, and one of chalcogen elements of S, Se, and Te.

The protective layer may have a thickness of about 10 nm or less.

The ferroelectric material layer may be positively polarized or negatively polarized according to the charging characteristic of the triboelectric charging layer.

BRIEF DESCRIPTION OF THE DRAWINGS

These and/or other example embodiments will become apparent and more readily appreciated from the following description of the embodiments, taken in conjunction with the accompanying drawings in which.

DETAILED DESCRIPTION

Reference will now be made in detail to example embodiments, illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures. As used herein, the term "and/or" includes any and all combinations of one or more of the associated listed items. Expressions such as "at least one of," when preceding a list of elements, modify the entire list of elements and do not modify the individual elements of the list.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicated.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

Figure 1:
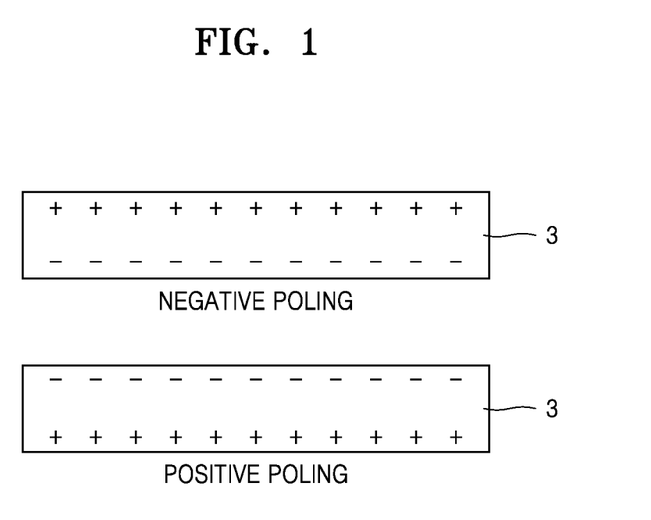
FIG. 1 is a view illustrating a method of polling a ferroelectric material layer according to an example embodiment.

FIG. 1 is a view illustrating a method of polling a ferroelectric material layer 3 according to an example embodiment.

Referring to FIG. 1, the ferroelectric material layer 3 may perform both positive poling and negative poling. In this case, the poling polarity that is to be performed may be determined according to a charging characteristic of a charged object in contact with the ferroelectric substance layer 3, that is, a characteristic of whether or not the charged object is relatively more positively (+) charged or negatively (−) charged than the ferroelectric material layer 3.

Figure 2:
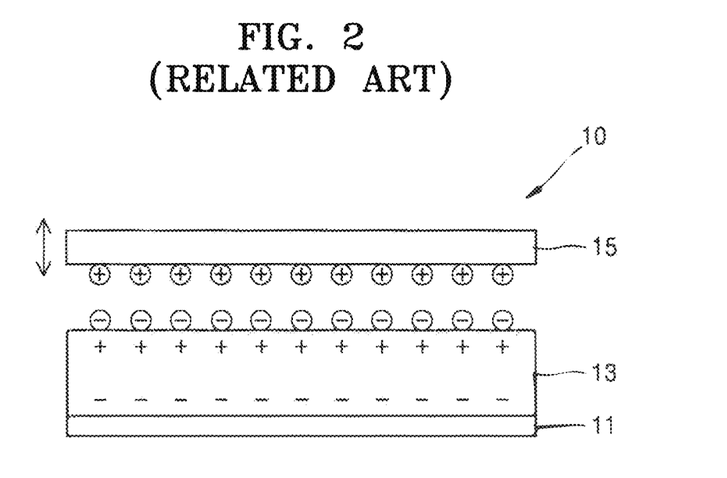
FIG. 2 is a cross-sectional view of a general triboelectric generator.

FIG. 2 is a cross-sectional view of a general triboelectric generator 10.

Referring to FIG. 2, the triboelectric generator 10 includes first and second electrodes 11 and 15 spaced apart from each other and a ferroelectric material layer 13 provided over the first electrode 11. In such a structure, the ferroelectric material layer 13 may generate electrical energy by contact with the second electrode 15. Charges generated on a surface of the ferroelectric material layer 13 due to contact between the ferroelectric material layer 13 and the second electrode 15 are externally exposed. Therefore, the charges typically disappear due to external air and moisture over time, and the output may be reduced.

Figure 3:
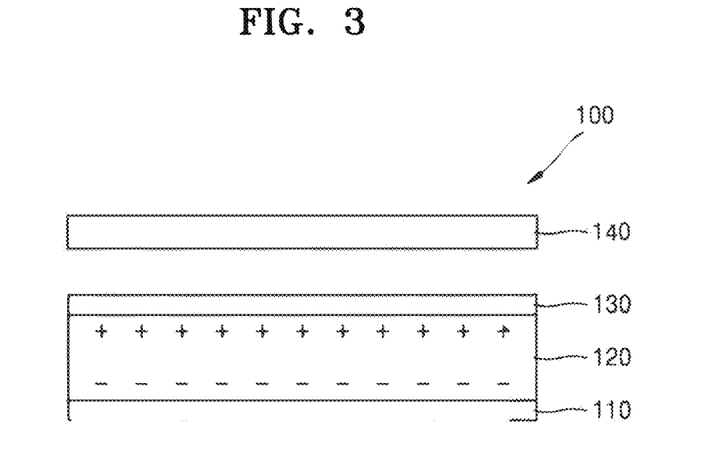
FIG. 3 is a cross-sectional view of a triboelectric generator according to an example embodiment.

FIG. 3 is a cross-sectional view of a triboelectric generator 100 according to an example embodiment.

Referring to FIG. 3, the triboelectric generator 100 includes first and second electrodes 110 and 140 spaced apart from each other, a ferroelectric material layer 120 provided over the first electrode 110, and a protective layer 130 provided over the ferroelectric material layer 120. The ferroelectric material layer 120 is provided over an upper surface of the first electrode 110 facing the second electrode 140.

The first and second electrodes 110 and 140 may include a conductive material. For example, the first and second electrodes 110 and 140 may have rigid characteristics. Alternatively, one or both of the first and second electrodes 110 and 140 may have flexible and stretchable characteristics. In this case, the flexible and stretchable electrodes may include, but are not limited to, one or more combinations selected from, for example, carbon nanotubes (CNTs), graphene, silver (Ag) nanowires, metal, and metal meshes. Furthermore, the flexible and stretchable electrodes may be in the form of fabric formed of or including woven conductive fibers.

The ferroelectric material layer 120 may be formed on the upper surface of the first electrode 110 and may be polarized. A polarity of the ferroelectric material layer 120 may be aligned through a poling operation. For example, an electric field may be externally applied to the ferroelectric material layer 120 to polarize the ferroelectric material layer 120.

The ferroelectric material layer 120 may perform both positive poling and negative poling, as seen in FIG. 1. In this case, the poling polarity that is to be performed may be determined according to a charging characteristic of the second electrode 140, that is, a characteristic of whether the second electrode 140 can be relatively more positively (+) charged or negatively (−) charged than the ferroelectric material layer 120. The ferroelectric material layer 120 may include at least one of polyvinylidene fluoride (PVDF), PVDF-trifluoroethylene (TrFE), lead zirconate titanate (PZT), platinum oxide (PTO), barium tin oxide (BTO), bismuth ferric oxide (BFO), $KNbO_3$, $NaNbO_3$, germanium telluride (GeTe), zinc-oxide (ZnO), $ZnSnO_3$, and gallium nitride (GaN). The ferroelectric material layer 120 may generate electrical energy by contacting the second electrode 140 and the protective layer 130.

The protective layer 130 may be provided over the ferroelectric material layer 120. When the protective layer 130 and the second electrode 140 are in contact with each other, the protective layer 130 may substantially prevent charges generated on a surface of the ferroelectric material layer 120 from diffusing and disappearing due to charging characteristics of the ferroelectric material layer 120 and the second electrode 140. That is, the charges generated on the surface of the ferroelectric material layer 120 may be trapped by the protective layer 130 to substantially prevent diffusion thereof.

The protective layer 130 may be sufficiently thin such that electrical energy can be generated due to the charging characteristics of the ferroelectric material layer 120 and the second electrode 140 by the contact between the protective layer 130 and the second electrode 140. For example, the protective layer 130 may have a thickness of about 10 nm or less.

The protective layer 130 may include, for example, hexagonal-boron nitride (h-BN) and/or transition metal dichalcogenide (TMD).

h-BN is an insulator having a two-dimensional (2D) crystal structure. h-BN has good thermal stability and mechanical strength, high thermal conductivity and a low dielectric constant. The TMD is a semiconductor having a 2D crystal structure. For example, the TMD may include one of transition metals of molybdenum (Mo), tungsten (W), niobium (Nb), vanadium (V), tantalum (Ta), titanium (Ti), zirconium (Zr), hafnium (Hf), technetium (Tc), and rhenium (Re), and one of chalcogen elements of sulfur (S), selenium (Se), and tellurium (Te). Here, the TMD may be represented by, for example, $MX_2$, where M is a transition metal and X is a chalcogen element. M may be Mo, W, Nb, V, Ta, Ti, Zr, Hf, Tc, or Re, and X may be S, Se, Te or the like. The TMD may include, for example, $MoS_2$, $MoSe_2$, $MoTe_2$, $WS_2$, $WSe_2$, $WTe_2$, $ZrS_2$, $ZrSe_2$, $HfS_2$, $HfSe_2$, $NbSe_2$, $ReSe_2$ or the like. Alternatively, the TMD may not be represented by $MX_2$. In this case, for example, the TMD may include copper (Cu), which is a transition metal, and copper sulfide (CuS), which is a compound of S, which is a chalcogen element. Meanwhile, the TMD may be a chalcogenide material including a non-transition metal. The non-transition metal may include, for example, Ga, In, Sn, Ge, Pb or the like. In this case, the TMD may include a non-transition metal such as gallium (Ga), indium (In), tin (Sn), germanium (Ge), and lead (Pb), and a compound of a chalcogen element such as S, Se, or Te. For example, the TMD may include $SnSe_2$, GaS, GaSe, GaTe, GeSe, $In_2Se_3$, $InSnS_2$ or the like.

In summary, the TMD is a metal element selected from Mo, W, Nb, V, Ta, Ti, Zr, Hf, Tc, Re, Cu, Ga, In, Sn, Ge, and Pb, and may include one of chalcogen elements of S, Se, and Te. However, the materials described above are merely examples, and other materials may be used as TMD materials.

The second electrode 140 may be formed of or include a material having a charging characteristic that is opposite to the charging characteristic of the ferroelectric substance layer 120 so that the second electrode 140 may repeat a contact or non-contact state with the protective layer 130 provided over the ferroelectric material layer 120.

For example, the second electrode 140 may contact the protective layer 130 by applying a force to the second electrode 140, and may not contact the protective layer 130 by applying an opposite force to the second electrode 140.

A material forming each of the ferroelectric material layer 120 and the second electrode 140 may be selected with reference to, for example, a known triboelectric series.

When the protective layer 130 provided over the ferroelectric material layer 120 is contacted with and separated from the second electrode 140, the ferroelectric material layer 120 may be negatively (−) charged, and the ferroelectric material layer 120 may be negatively polarized when the second electrode 140 is positively (+) charged. For example, the ferroelectric material layer 120 may be negatively polarized so that a dipole may be aligned such that an upper portion of the ferroelectric material layer 120 is positive (+) and a lower portion of the ferroelectric material layer 120 is negative (−). This is to increase a size of generated triboelectricity. Although FIG. 3 illustrates a case where the ferroelectric material layer 120 is negatively polarized, the polarity of the ferroelectric material layer 120 is not limited thereto.

Triboelectricity generated when the second electrode 140 changes from a state in which the second electrode 140 is in contact with the protective layer 130 provided over the ferroelectric layer 120 to a non-contact state may be transmitted through the first and second electrodes 110 and 140.

In order to utilize the generated triboelectricity, the triboelectric generator 100, according to an example embodiment, may further include lead wires (not shown) that can be respectively connected to the first and second electrodes 110 and 140, and a load may be connected to the lead wires. A device using electricity or the like may be used as the load, and for example, a battery configured to store generated triboelectricity may be used, but the inventive concepts are not limited thereto.

Figure 4A:
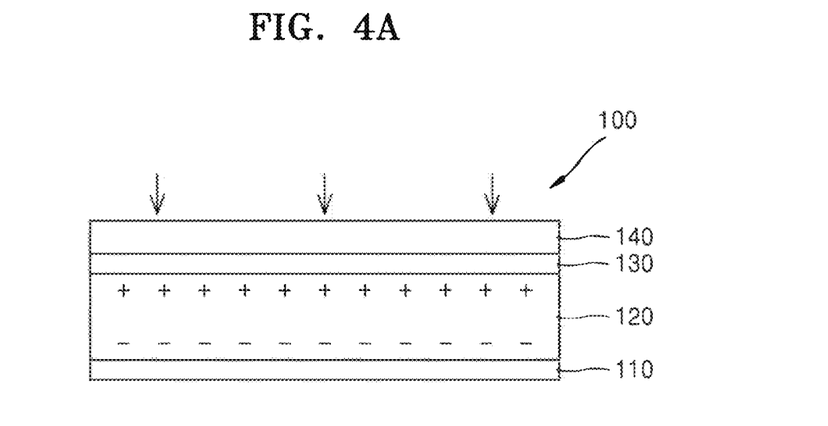
FIGS. 4A and 4B are views illustrating generation of electric energy by the triboelectric generator of FIG. 3 according to an example embodiment.
Figure 4B:
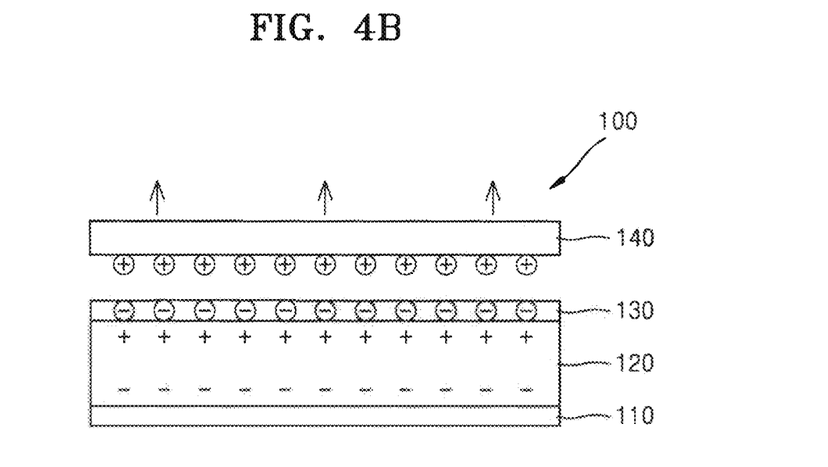

FIGS. 4A and 4B are views illustrating generation of electric energy by triboelectric generator 100 of FIG. 3 according to an example embodiment.

Referring to FIG. 3, the ferroelectric material layer 120 is provided over the upper surface of the first electrode 110, the protective layer 130 is provided over the ferroelectric material layer 120, and the protective layer 130 and the second electrode 140 are spaced apart from each other by a desired, or alternatively, predetermined distance.

Referring to FIGS. 4A and 4B, pressure applied to the second electrode 140 from the outside causes the protective layer 130 provided over the ferroelectric layer 120 and the second electrode 140 to contact each other. In this process, an upper surface of the ferroelectric material layer 120 and a lower surface of the second electrode 140 may be charged with charges having a desired, or alternatively, predetermined polarity by triboelectrification, respectively. Next, electric energy is generated during the process of separating the second electrode 140 which is in contact with the protective layer 130 from the protective layer 130, and the generated electric energy may be collected through the first and second electrodes 110 and 140. In addition, a current generated during the process of the second electrode 140 moving away from or closer to the protective layer 130 provided with the ferroelectric material layer 120 may flow in opposite directions.

Figure 5:
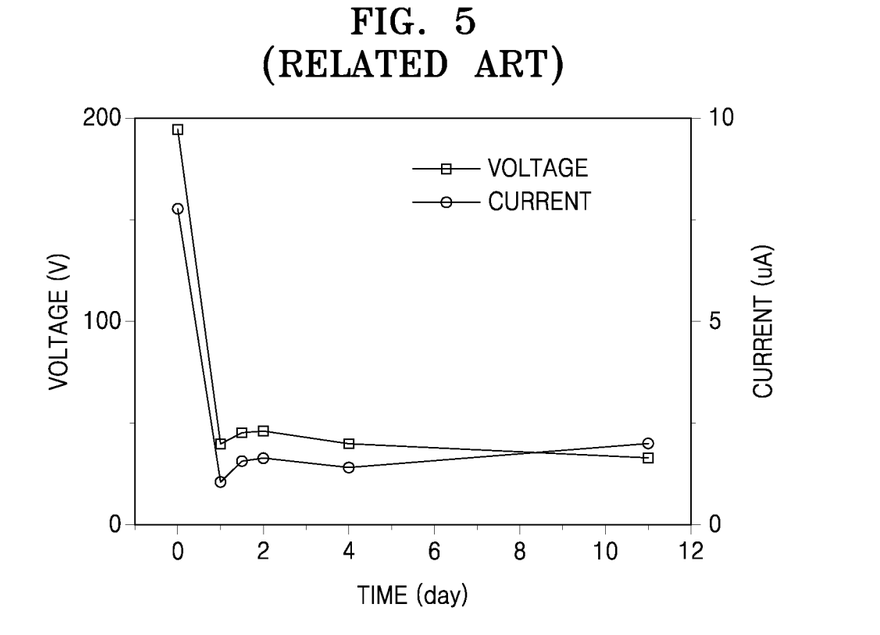
FIG. 5 is a graph illustrating changes in a voltage and a current over time in the general triboelectric generator of FIG. 2.
Figure 6:
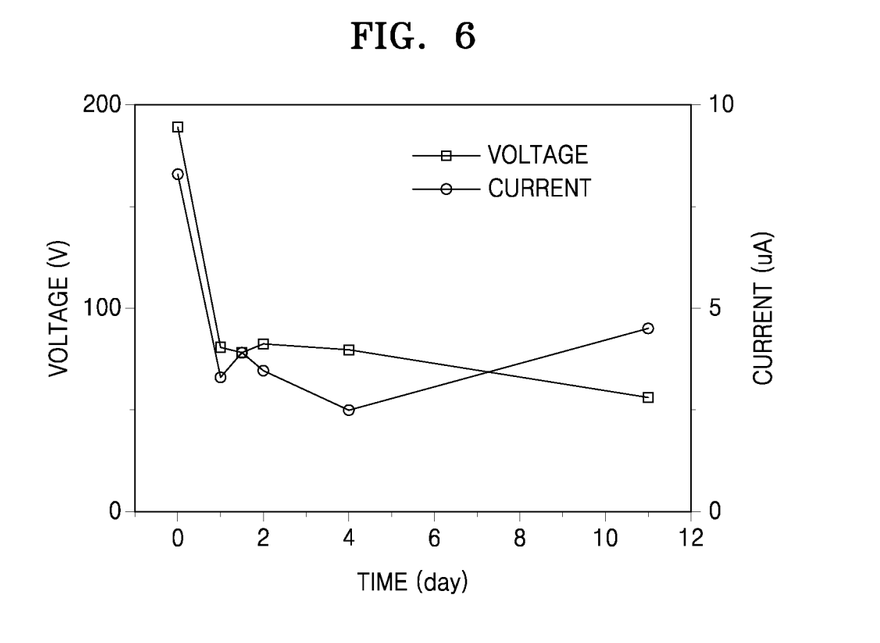
FIG. 6 is a graph illustrating changes in a voltage and a current over time in the triboelectric generator according to an example embodiment of FIG. 3.

FIG. 5 is a graph illustrating changes in a voltage and a current over time in the general triboelectric generator 10 of FIG. 2, and FIG. 6 is a graph illustrating changes in a voltage and a current over time in the triboelectric generator 100 according to an example embodiment of FIG. 3.

Referring to FIGS. 5 and 6, outputs of the triboelectric generator 10 of FIG. 5 and the triboelectric generator 100 of FIG. 6 show a tendency to decrease over time. That is, both the voltage and current generated by the triboelectric generators 10 and 200 decrease over time.

However, it can be seen that the triboelectric generator 100 of FIG. 6 exhibits a lesser decrease in output over time than the triboelectric generator 10 of FIG. 5. This is because the protective layer 130 provided over the ferroelectric material layer 120 in the triboelectric generator 100 substantially prevents the charges generated on the surface of the ferroelectric material layer 120 from diffusing away and/or disappearing. As a result, it can be seen that the protective layer 130 has an effect of lessening the reduction in the output of the triboelectric generator 100 over time.

Figure 7:
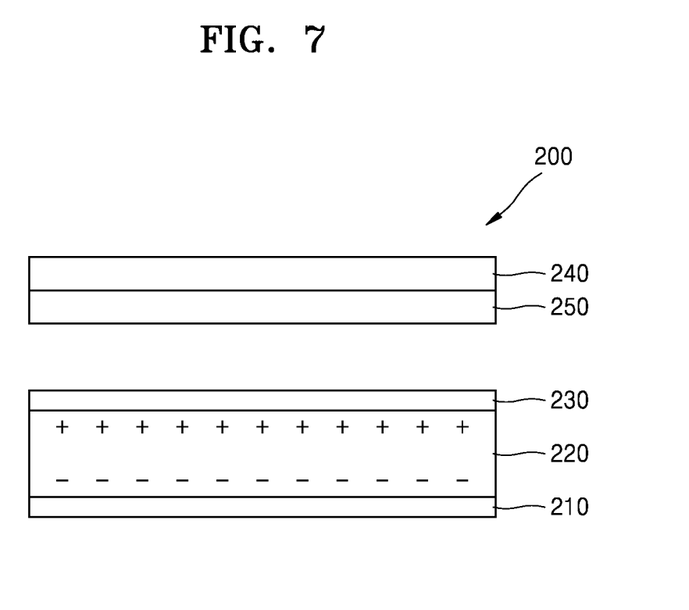
FIG. 7 is a cross-sectional view of a triboelectric generator according to another example embodiment.

FIG. 7 is a cross-sectional view of a triboelectric generator 200 according to another example embodiment.

Referring to FIG. 7, the triboelectric generator 200 includes first and second electrodes 210 and 240 spaced apart from each other, a ferroelectric material layer 220 provided over the first electrode 210, a protective layer 230 provided over the ferroelectric material layer 220, and a triboelectric charging layer 250 under the second electrode 240. The ferroelectric material layer 220 is provided over an upper surface of the first electrode 210 facing the second electrode 240.

The first and second electrodes 210 and 240 may include a conductive material. For example, the first and second electrodes 210 and 240 may have rigid characteristics. Alternatively, one or both of the first and second electrodes 210 and 240 may have flexible and stretchable characteristics.

The ferroelectric material layer 220 may be formed on the upper surface of the first electrode 210 and may be polarized. A polarity of the ferroelectric material layer 220 may be aligned through a poling operation. For example, an electric field may be externally applied to the ferroelectric material layer 220 to polarize the ferroelectric material layer 220.

The ferroelectric material layer 220 may perform both positive poling and negative poling, as seen in FIG. 1. In this case, the polarity that is to be performed may be determined according to a charging characteristic of the triboelectric charging layer 250, that is, a characteristic of whether the triboelectric charging layer 250 can be relatively more positively (+) charged or more negatively (−) charged than the ferroelectric material layer 220. The ferroelectric material layer 220 may include at least one of PVDF, PVDF-TrFE, PZT, PTO, BTO, BFO, $KNbO_3$, NaNbO3, GeTe, ZnO, $ZnSnO_3$, and GaN. The ferroelectric material layer 220 may generate electrical energy by contacting the triboelectric charging layer 250 and the protective layer 230.

The protective layer 230 may be provided over the ferroelectric material layer 220. When the protective layer 230 and the triboelectric charging layer 250 are in contact with each other, the protective layer 230 may substantially prevent charges generated on a surface of the ferroelectric material layer 220 from diffusing and/or disappearing due to charging characteristics of the ferroelectric material layer 220 and the triboelectric charging layer 250. That is, the charges generated on the surface of the ferroelectric material layer 220 may be trapped by the protective layer 230 to reduce or prevent diffusion.

The protective layer 230 may be sufficiently thin such that electrical energy can be generated due to the charging characteristics of the ferroelectric material layer 220 and the triboelectric charging layer 250 by the contact between the protective layer 230 and the triboelectric charging layer 250. For example, the protective layer 230 may have a thickness of about 10 nm or less. The protective layer 230 may include, for example, h-BN and/or TMD.

The triboelectric charging layer 250 may be formed of or include a material having a charging characteristic that is opposite to the charging characteristic of the ferroelectric substance layer 220 so that the triboelectric charging layer 250 may repeat a contact or non-contact state with the protective layer 230 provided over the ferroelectric material layer 220.

For example, the triboelectric charging layer 250 may contact the passivation layer 230 by applying a force to an upper portion of the second electrode 240, and may not contact the passivation layer 230 by applying an opposite force thereto.

A material forming each of the ferroelectric material layer 220 and the triboelectric charging layer 250 may be selected with reference to a known triboelectric series.

When the protective layer 230 provided over the ferroelectric material layer 220 is contacted with and separated from the triboelectric charging layer 250, the ferroelectric material layer 220 may be negatively (−) charged, and the ferroelectric material layer 220 may be negatively polarized when the triboelectric charging layer 250 is positively (+) charged. For example, the ferroelectric material layer 220 may be negatively polarized so that a dipole may be aligned such that an upper portion of the ferroelectric material layer 220 is positive (+) and a lower portion of the ferroelectric material layer 220 is negative (−). As a result, a size of the generated triboelectricity may be increased. FIG. 7 shows a case where the ferroelectric material layer 220 is negatively polarized, but is not limited thereto.

Triboelectricity generated when the triboelectric charging layer 250 changes from a state in which the triboelectric charging layer 250 is in contact with the protective layer 230 provided over the ferroelectric layer 220 to a non-contact state may be transmitted through the first and second electrodes 210 and 140.

In order to utilize the generated triboelectricity, the triboelectric generator 200 according to an example embodiment may further include lead wires (not shown) that can be respectively connected to the first and second electrodes 210 and 240, and a load may be connected to the lead wires. A device using electricity or the like may be used as the load, and for example, a battery capable of storing generated triboelectricity may be used, but the inventive concepts are not limited thereto.

Figure 8A:
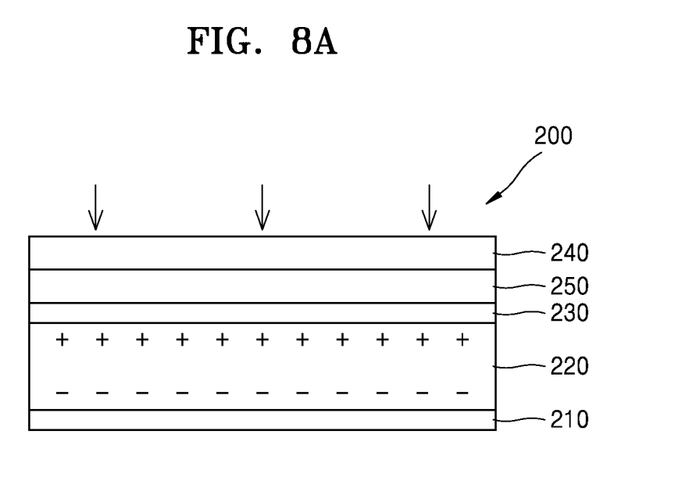
FIGS. 8A and 8B are views illustrating generation of electric energy by the triboelectric generator of FIG. 3 according to an example embodiment.
Figure 8B:
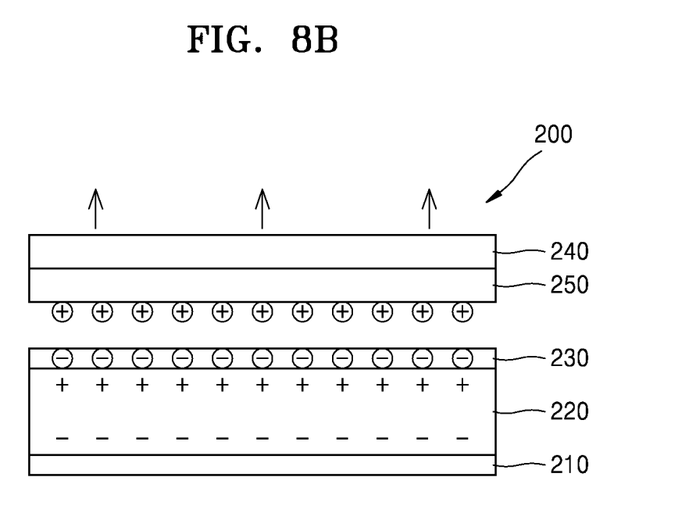

FIGS. 8A and 8B are views illustrating the generation of electric energy by the triboelectric generator of FIG. 3 according to an example embodiment.

Referring to FIG. 7, the ferroelectric material layer 220 is provided over the upper surface of the first electrode 210, the protective layer 230 is provided over the ferroelectric material layer 220, and the protective layer 230 and the triboelectric charging layer 250 under the second electrode 240 are spaced apart from each other by a desired, or alternatively, predetermined distance.

Referring to FIGS. 8A and 8B, pressure applied to the second electrode 240 from the outside causes the protective layer 230 provided over the ferroelectric layer 220 and the triboelectric charging layer 250 to contact each other. In this process, an upper surface of the ferroelectric material layer 220 and a lower surface of the triboelectric charging layer 250 may be charged with charges having a desired, or alternatively predetermined polarity by triboelectrification, respectively. Next, electric energy is generated in the process of separating the triboelectric charging layer 250 which is in contact with the protective layer 230 from the protective layer 230, and the generated electric energy may be collected through the first and second electrodes 210 and 240. In addition, a current generated in the process of the triboelectric charging layer 250 moving away from, or closer to, the protective layer 230 provided with the ferroelectric material layer 220 may flow in opposite directions.

As described above, according to example embodiments, electric potential generated by ferroelectric characteristics of materials may be used to control an electrostatic characteristic caused by friction and amplify a charging difference of the materials due to the friction to improve an output of a triboelectric generator. Furthermore, a protective layer provided over a ferroelectric material layer may reduce a reduction in an output of the triboelectric generator due to diffusion of charges generated on a surface of the ferroelectric material layer.

It should be understood that example embodiments described herein should be considered in a descriptive sense only and not for purposes of limitation. Descriptions of features within each example embodiment should typically be considered as available for other similar features in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A triboelectric generator comprising:
a first electrode and a second electrode, the first and second electrodes being spaced apart from each other;
a polarized ferroelectric material layer over the first electrode; and
a protective layer being spaced apart from the first electrode with the ferroelectric material layer interposed therebetween, the protective layer comprising hexagonal-boron nitride (h-BN) and configured to trap charges generated on the ferroelectric material layer to prevent the charges from diffusing to the outside, wherein
the second electrode is configured to repeat a contact state and a non-contact state with the protective layer, and
the ferroelectric material layer is configured to generate electricity by a separation between the protective layer and the second electrode, the separation caused by a transition from the contact state to the non-contact state.

2. The triboelectric generator of claim 1, wherein:
the second electrode has a charging characteristic that is opposite to a charging characteristic of the polarized ferroelectric material layer.

3. The triboelectric generator of claim 2, wherein:
the ferroelectric material layer comprises at least one of polyvinylidene fluoride (PVDF), PVDF-trifluoroethylene (TrFE), lead zirconate titanate (PZT), platinum oxide (PTO), barium tin oxide (BTO), bismuth ferric oxide (BFO), $KNbO_3$, $NaNbO_3$, germanium telluride (GeTe), zinc-oxide (ZnO), $ZnSnO_3$, and gallium nitride (GaN).

4. The triboelectric generator of claim 2, wherein:
the protective layer includes transition metal dichalcogenide (TMD).

5. The triboelectric generator of claim 4, wherein:
the TMD comprises one of molybdenum (Mo), tungsten (W), niobium (Nb), vanadium (V), tantalum (Ta), titanium (Ti), zirconium (Zr), hafnium (Hf), technetium (Tc), and rhenium (Re), and one of sulfur (S), selenium (Se), and tellurium (Te).

6. The triboelectric generator of claim 4, wherein:
the protective layer has a thickness of about 10 nm or less.

7. The triboelectric generator of claim 2, wherein
the ferroelectric material layer is positively polarized or negatively polarized according to the charging characteristic of the second electrode.

8. The triboelectric generator of claim 1, wherein the first and second electrodes include at least one of carbon nanotubes (CNTs), graphene, and silver (Ag) nanowires.

9. A triboelectric generator comprising:
a first electrode and a second electrode, the first and second electrodes being spaced apart from each other, and including at least one of carbon nanotubes (CNTs), graphene, and silver (Ag) nanowires;
a polarized ferroelectric material layer over the first electrode and configured to generate electrical energy by contact with another material, the ferroelectric material layer comprising PVDF-trifluoroethylene (TrFE);
a protective layer being spaced apart from the first electrode with the ferroelectric material layer interposed therebetween, the protective layer comprising hexagonal-boron nitride (h-BN) and configured to trap charges generated on the ferroelectric material layer to prevent the charges from diffusing to the outside; and
a triboelectric charging layer under the second electrode.

10. The triboelectric generator of claim 9, wherein
the triboelectric charging layer has a charging characteristic that is opposite to a charging characteristic of the ferroelectric material layer.

11. The triboelectric generator of claim 10, wherein
the polarized ferroelectric material layer is configured to generate electrical energy by contact between the triboelectric charging layer and the protective layer.

12. The triboelectric generator of claim 10, wherein:
the protective layer includes transition metal dichalcogenide (TMD).

13. The triboelectric generator of claim 12, wherein:
the TMD comprises one of molybdenum (Mo), tungsten (W), niobium (Nb), vanadium (V), tantalum (Ta), titanium (Ti), zirconium (Zr), hafnium (Hf), technetium (Tc), and rhenium (Re), and one of sulfur (S), selenium (Se), and tellurium (Te).

14. The triboelectric generator of claim 12, wherein:
the protective layer has a thickness of about 10 nm or less.

15. The triboelectric generator of claim 10, wherein:
the ferroelectric material layer is positively polarized or negatively polarized according to the charging characteristic of the triboelectric charging layer.

* * * * *